United States Patent [19]
Ammann et al.

[11] Patent Number: 5,987,763
[45] Date of Patent: Nov. 23, 1999

[54] DRIVE DEVICE FOR ALIGNING A THEODOLITE

[75] Inventors: Manfred Ammann, Lauterach, Austria; Anton Haele, Widnau, Switzerland

[73] Assignee: Leica Geosystems AG, Heerbrugg, Switzerland

[21] Appl. No.: 08/839,338

[22] Filed: Apr. 18, 1997

[30] Foreign Application Priority Data

Apr. 19, 1996 [DE] Germany ............................ 196 15 515

[51] Int. Cl.[6] .............................. G01C 1/02; G01C 15/00
[52] U.S. Cl. ................................ 33/290; 33/281; 33/285; 33/1 PT
[58] Field of Search ............................. 33/290, 291, 292, 33/281, 285, 286, 1 N, 1 PT

[56] References Cited

U.S. PATENT DOCUMENTS

| | | | |
|---|---|---|---|
| 4,644,659 | 2/1987 | Takahama | 33/285 |
| 4,752,126 | 6/1988 | Fujii | 33/285 |
| 5,052,119 | 10/1991 | Eventoff | 33/1 PT |
| 5,475,930 | 12/1995 | Kimura | 33/290 |
| 5,533,268 | 7/1996 | Keightley | 33/290 |
| 5,621,975 | 4/1997 | Rando | 33/1 PT |
| 5,689,892 | 11/1997 | Beckingham | 33/292 |
| 5,711,080 | 1/1998 | Yamada | 33/290 |
| 5,742,387 | 4/1998 | Ammann | 33/290 |

FOREIGN PATENT DOCUMENTS

| | | |
|---|---|---|
| 3324489 | 1/1985 | Germany . |
| 87/07366 | 12/1987 | WIPO . |

OTHER PUBLICATIONS

Leica AG, "Vermessungisntrumente," 1993 (No month).

*Primary Examiner*—Christopher W. Fulton
*Attorney, Agent, or Firm*—Foley & Lardner

[57] ABSTRACT

A drive device for aligning a theodolite with a target, in which the theodolite is mounted rotatably in the horizontal direction on a theodolite foot. Provision is made of a control knob and an encoder connected thereto, the encoder emitting control signals in accordance with the rotary movement at the control knob to a downstream control circuit. The circuit drives a positioning motor. The rotary table is arranged at the theodolite foot and carries the control knob. Provided between the theodolite and the rotary table is an electric contact which ensures the electrical connection between the encoder and the positioning motor.

20 Claims, 2 Drawing Sheets

DRIVE DEVICE FOR ALIGNING A THEODOLITE

FIELD OF THE INVENTION

The invention relates to a drive device for aligning a theodolite with a target, in which the theodolite is mounted rotatably in the horizontal direction on a theodolite foot.

BACKGROUND OF THE INVENTION

Modern theodolites as described, for example, in the printed publication "Prospekt, Vermessungsinstrumente, Leica AG, Liste G1 916d, Schweiz 1993" [Brochure, Measuring instruments, Leica AG, List G1 916d, Switzerland 1993] are distinguished by a high setting precision in the horizontal and vertical directions. Depending on the precision class of the respective theodolite, it is possible, in this case, to achieve standard deviations of up to 0.3". This corresponds to a setting precision of <0.2 millimeter at a distance of 100 meters.

It becomes clear from this example that these precisions can be achieved only by an extremely high outlay on precision mechanics. In order to ensure this, a transition has been made to equip the manually controlled positioning drive, which is a rotating knob as a rule, with an encoder. The encoder signals are used to drive a setting motor. The manual alignment of the theodolite is therefore no longer done by a purely precision-mechanical gear, but by using a combination having electronic and mechanical drive elements.

Such drives have proven themselves in practice. However, vibrations and twisting movements are transmitted to the theodolite when the rotating knob is actuated. Exact sighting of the target is rendered difficult by such vibrations and twisting movements, particularly in the case of theodolites of the highest precision class.

The problems identified are not intended to be exhaustive but are among the many that reduce the precision of theodolites. Other problems may also exist. However, those presented above should be sufficient to demonstrate that currently known solutions are amenable to worthwhile improvement.

SUMMARY OF THE INVENTION

It is therefore a primary object of the present invention to start from the known theodolites and configure the drives to be free from vibration and twisting, in order to minimize the effect of the actuating forces during operation of the theodolite.

In accomplishing this and other objects, there has been provided, in accordance with the present invention, a drive device for aligning a theodolite with a target. The device comprises a theodolite pivotally mounted on a theodolite foot and having a theodolite housing. A rotary table is arranged at the theodolite foot and includes at least one control knob which is connected to the theodolite foot. At least one encoder is connected to the theodolite foot and emits control signals in accordance with rotary movement of the at least one control knob. A positioning motor is provided and is driven by a control circuit which receives the control signals emitted from the at least one encoder. An electric contact is provided between the theodolite and the rotary table to ensure electric connection between the at least one encoder and the control circuit.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENT

A drive device aligns a theodolite with a target. The theodolite is mounted rotatably in the horizontal direction on a theodolite foot and has a control knob and an encoder connected to the theodolite foot. The encoder emits control signals in accordance with the rotary movement at the control knob to a downstream control circuit which drives a positioning motor. At the theodolite foot, there is a rotary table which carries the control knob. An electric contact is provided between the theodolite and the rotary table. The electric contact ensures the electrical connection between the encoder and the positioning motor.

Figure 1:
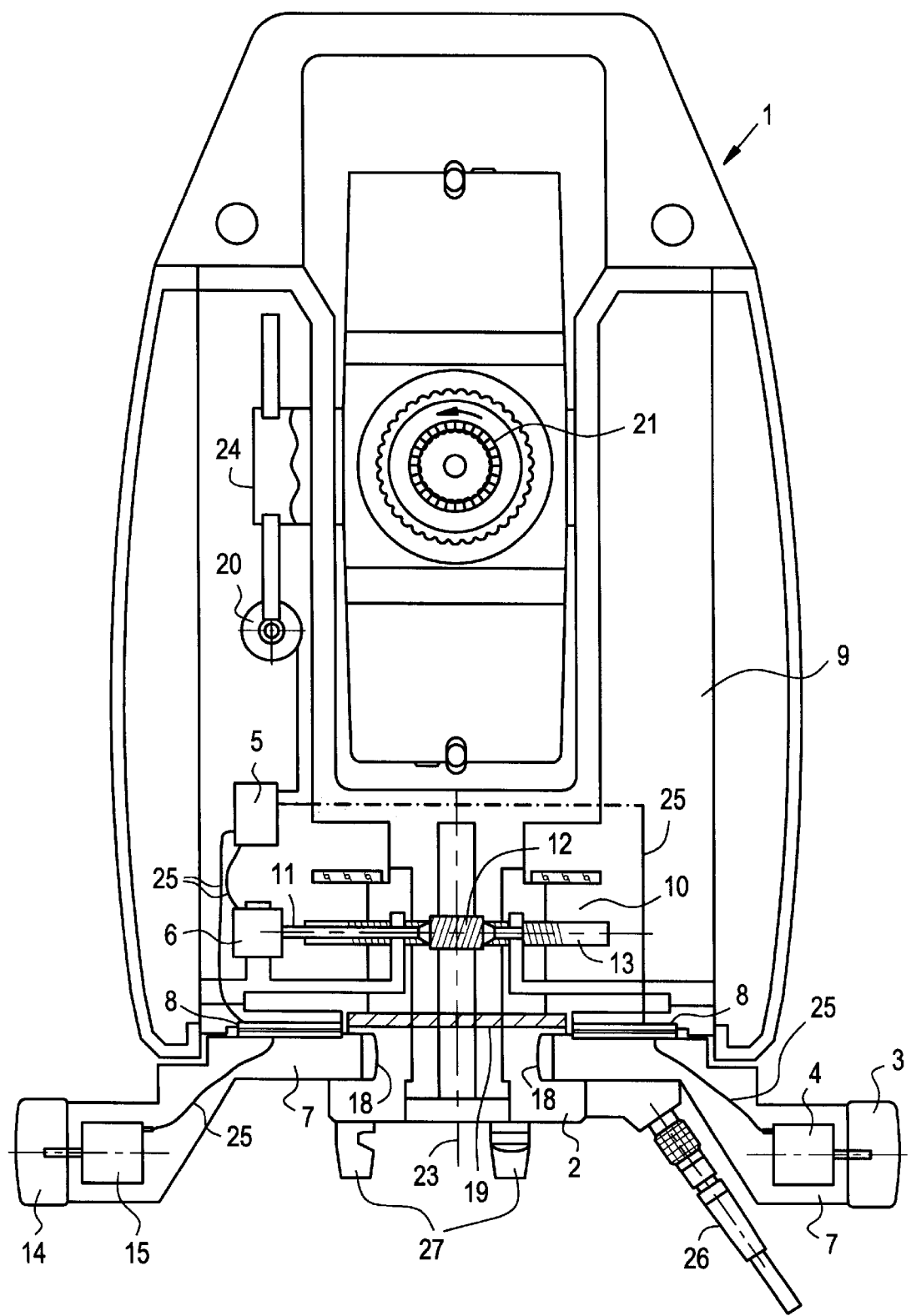
FIG. 1 is a sectional representation of the theodolite with the rotary table.
Figure 2:
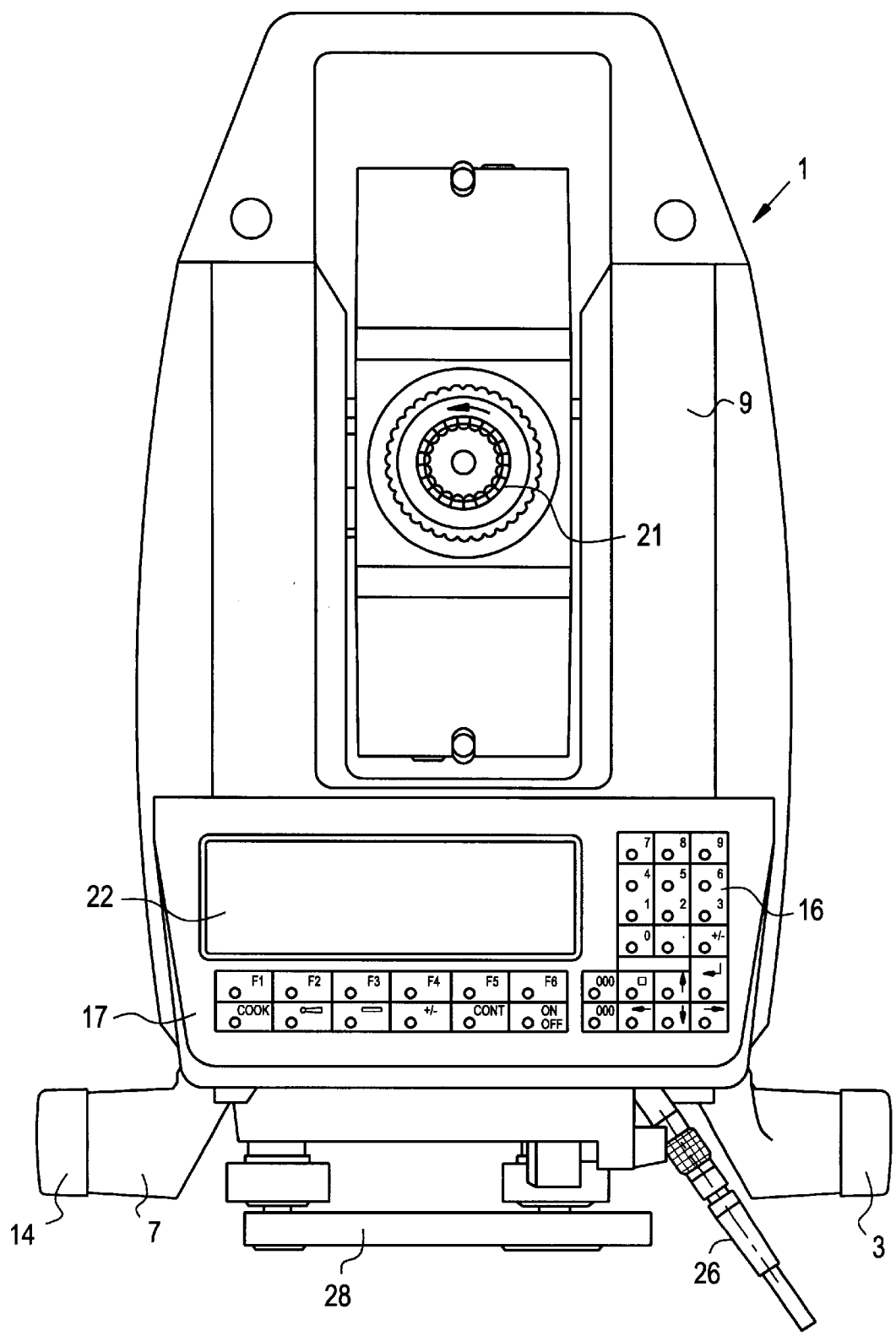
FIG. 2 is a view of the theodolite with the rotary table and keyboard.

FIG. 1 shows a theodolite 1 which is mounted with its housing 9 on a theodolite foot 2 such that it can rotate about a vertical axis 23 in the horizontal direction. The theodolite foot 2 has index pins 27 by which the theodolite 1 can be mounted in a known way on a stand (not shown) with a tripod 28 (FIG. 2).

A horizontal positioning motor 6 is provided to drive the theodolite 1 in the horizontal direction. The horizontal positioning motor 6 includes a downstream gear 10 which has a slipping clutch 11, a drive worm 13 and a worm wheel 12. The horizontal positioning motor 6 is connected by electric control lines 25 to a control circuit 5 arranged in the theodolite housing.

The theodolite 1 has a telescope 21 which can be pivoted in a vertical direction and is driven by a gear 24 and a vertical positioning motor 20.

Arranged at the theodolite foot 2 is a rotary table 7 which has a first control knob 3 and a second control knob 14. A horizontal encoder 4 is assigned to the first control knob 3. A vertical encoder 15 is assigned to the second control knob 14. The encoders 4, 15 convert the rotary movements at the associated control knobs 3, 14, respectively, into electrical signals and feed them to the control circuit 5 via the control lines 25. The vertical positioning motor 20 and the horizontal positioning motor 6 are driven appropriately by the rotating knobs 3, 14, respectively.

In order to permit a rotary movement of the theodolite housing with respect to the rotary table 7 or the theodolite foot 2 while preserving the electrical contact between the encoders 4, 15 and the control circuit 5, an electric contact 8 is arranged between the theodolite housing 1 and the rotary table 7. This contact 8 provides electrical connection between the encoders 4, 15 and the control circuit 5 and is constructed as a slip ring.

An external control line 26 is provided at the theodolite foot 2 for the purpose of externally controlling the theodolite and transmitting data to a downstream computer (not shown).

To align the theodolite 1 with a target, the theodolite 1 is mounted by the index pins 27 to a tripod on a stand and aligned vertically in a known way. Thereafter, the theodolite housing 1 is rotated manually in the direction of the target for the purpose of coarse alignment with the target. A slipping clutch 11 is provided between the horizontal motor 6 and the gear 10, so that this manual rotary movement is not blocked by the horizontal positioning motor 6 and the gear 10.

After this coarse alignment with the target, which can also be undertaken in a similar way for the theodolite telescope 21, the accurate sighting of the target is undertaken by the rotating knobs 3 and 14. The rotary movement at these knobs 3, 14 is converted by the encoders 4, 15, respectively, into electric signals and fed via the control lines 25 and the contacts 8 to the control circuit 5 which applies current to the positioning motors 6 and 20.

The theodolite 1 then rotates in the direction of the target and is decoupled mechanically in the process from the manually controlled components such that the control elements cannot transmit any sort of vibrations or twisting movements to the theodolite housing 9.

In a further refinement of the invention, the rotary table 7 is arranged rotatably at the theodolite foot 2 by a friction brake 18. Furthermore, there is provided between the theodolite housing 9 and the rotary table 7 a coded disk 19 by which the position of the rotary table 7 can be uniquely determined relative to the theodolite housing 9.

These measures simplify the coarse alignment of the theodolite with the target. By rotating the table 7 in the direction of the target, the coded disk 8 records the change in position of the theodolite housing 9 relative to the rotary table 7. The control circuit 5 then applies current to the horizontal positioning motor 6 for the horizontal adjustment until the defined starting position of the theodolite housing 9 relative to the rotary table 7 corresponds again. The theodolite housing 9 is slaved in this way to the position of the rotary table 7. This eliminates the above-mentioned manual alignment of the theodolite with the target to be sighted.

FIG. 2 shows a view of the theodolite 1, which is mounted on a tripod 28. The theodolite 1 is equipped with a keyboard 17 which is fastened to the rotary table 7. The keyboard 17 has a display device 22 and several control elements 16 constructed as keys. As an example, the values of the measured angles and, if appropriate, the distance can be stored using these control elements 16. These values can be transmitted to a connected computer via the external control line 26.

All of the manually controlled elements of the theodolite housing 2 are decoupled mechanically according to the present invention. The measuring accuracy achievable using the theodolite can thereby be achieved in a simple way even in the case of manually sighting the target.

It is also within the scope of the invention to equip the theodolite only with a horizontal positioning motor or only with a vertical positioning motor. In the case of theodolites which are additionally equipped with a distance-measuring device (total stations), it is also possible to provide a positioning motor for focusing the telescope which is actuated analogously to the horizontal and vertical positioning motors by a combination of encoders and control knobs on the rotary table.

Other embodiments of the theodolite will be apparent to those skilled in the art from consideration of the specification disclosed herein. It is intended that the specification be considered as exemplary only, with the true scope and spirit of the invention being indicated by the following claims.

What is claimed is:

1. A drive device for aligning a theodolite with a target, the device comprising:

a theodolite pivotally mounted to a theodolite foot and having a theodolite housing, wherein the theodolite foot includes
a rotary table;
at least one control knob connected to the rotary table; and
at least one encoder connected to the rotary table, wherein the at least one encoder emits control signals in accordance with a rotary movement of the at least one control knob;
at least one positioning motor and a control circuit to drive the at least one positioning motor, the control circuit receiving the control signals emitted from the at least one encoder; and
an electric contact provided between the theodolite and the rotary table, wherein the electric contact provides a connection between the at least one encoder and the control circuit.

2. The drive device as claimed in claim 1, wherein the positioning motor is arranged in the theodolite housing and is connected to the theodolite foot by a gear and a slipping clutch.

3. The drive device as claimed in claim 2, wherein the gear has a worm wheel and a worm.

4. The drive device as claimed in claim 1, wherein the electric contact is constructed as a slip ring.

5. The drive device as claimed in claim 1, wherein the at least one positioning motor includes a horizontal positioning motor which drives horizontal adjustment of the theodolite.

6. The drive device as claimed in claim 1, wherein the at least one positioning motor includes a vertical positioning motor which drives vertical adjustment of the theodolite.

7. The drive device as claimed in claim 5, wherein the at least one control knob comprises a first control knob and a second control knob, the first control knob controlling the horizontal positioning motor.

8. The drive device as claimed in claim 6, wherein the at least one control knob comprises a first control knob and a second control knob, the second control knob controlling the vertical positioning motor.

9. The drive device as claimed in claim 1, wherein a control element is arranged on the rotary table to control the theodolite.

10. The drive device as claimed in claim 9, wherein an additional control element is arranged on the rotary table to store data.

11. The drive device as claimed in claim 10, wherein the control elements are located on a keyboard.

12. The drive device as claimed in claim 11, wherein the keyboard includes a display device.

13. The drive device as claimed in claim 1, further including a friction brake positioned between the rotary table and the theodolite foot.

14. The drive device as claimed in claim 1, further including a coded disk arranged between the rotary table and the theodolite, the coded disk determining the position of the theodolite relative to the rotary table.

15. The drive device as claimed in claim 14, wherein for the purpose of coarse manual alignment of the theodolite with the target, the rotary table is mounted rotatably in the direction of the target and the theodolite is slaved by the horizontal positioning motor.

16. A theodolite unit, comprising:
a theodolite foot including
a rotary table;
at least one control knob mounted to said rotary table; and at least one encoder mounted to said rotary table, wherein each of at least one encoder is assigned to each of the at least one control knob;

a theodolite housing rotatably mounted to said theodolite foot including a control circuit; and at least one positioning motor electrically connected to said control circuit; and an electric contact mounted between said theodolite housing and said rotary table, wherein said electric contact communicates an electric signal from said at least one encoder to said control circuit.

17. A theodolite unit as claimed in claim 16, further comprising a coded disk mounted between said theodolite foot and said theodolite housing, wherein said coded disk records a change in position of said theodolite housing with respect to said rotary table.

18. A theodolite unit as claimed in claim 16, wherein said at least one positioning motor includes a horizontal positioning motor and a vertical positioning motor.

19. A theodolite unit as claimed in claim 16, wherein said at least one encoder includes a vertical encoder and a horizontal encoder and at least one control knob includes a first control knob associated with said vertical encoder and a second control knob associated with said horizontal encoder.

20. A theodolite unit as claimed in claim 16, wherein said electrical contact is a slip ring.

* * * * *